United States Patent
Bleys

[11] Patent Number: 5,968,993
[45] Date of Patent: Oct. 19, 1999

[54] MICROCELLULAR ELASTOMERIC POLYURETHANE FOAMS

[75] Inventor: Gerard Jozef Bleys, Heverlee, Belgium

[73] Assignee: Imperial Chemical Industries PLC, London, United Kingdom

[21] Appl. No.: 08/872,037

[22] Filed: Jun. 10, 1997

[30] Foreign Application Priority Data

Jun. 27, 1996 [BE] Belgium ................................ 96110378

[51] Int. Cl.$^6$ ........................................ C08J 9/00
[52] U.S. Cl. ................ 521/50; 521/155; 521/159; 521/137; 528/67; 528/76; 528/85
[58] Field of Search .............. 521/50, 155, 159, 521/137; 528/67, 76, 85

[56] References Cited

U.S. PATENT DOCUMENTS

| | | | |
|---|---|---|---|
| 4,302,552 | 11/1981 | Hongu et al. | 521/176 |
| 4,365,025 | 12/1982 | Murch et al. | 521/159 |
| 4,525,491 | 6/1985 | Narisawa et al. | 521/174 |
| 5,070,114 | 12/1991 | Watts et al. | 521/159 |

FOREIGN PATENT DOCUMENTS

| | | |
|---|---|---|
| 31207 | 7/1981 | European Pat. Off. . |
| 547765 | 6/1993 | European Pat. Off. . |
| 2181736 | 4/1987 | United Kingdom . |

*Primary Examiner*—Duc Truong
*Attorney, Agent, or Firm*—Pillsbury Madison & Sutro Intellectual Property Group

[57] ABSTRACT

A method for the preparation of microcellular elastomeric polyurethane foams from a reaction mixture comprising a polyisocyanate component containing at least 85% by weight of 4,4'-diphenylmethane diisocyanate or a variant thereof, a polyol composition comprising at least one polyoxyalkylene polyol having an average nominal hydroxyl functionality of from 2 to 6, an average hydroxyl equivalent weight of at least 1300 and an average oxyethylene content of between 50 and 85% by weight, water, a chain extender having an average hydroxyl equivalent weight of from 15 to 250 and optionally a crosslinking agent, the hardblock-content being more than 45% by weight.

39 Claims, No Drawings

MICROCELLULAR ELASTOMERIC POLYURETHANE FOAMS

The present invention relates to the preparation of microcellular elastomeric polyurethane foams.

Conventional polyurethane elastomers are made from formulations which have a hardblock-content of about 30 to 40% by weight (hardblock-content being defined herein as the sum of the amounts of polyisocyanates, chain extruders and, optionally, cross-linking agents, relative to the total amount of polymer in weight percent).

Formulations having a higher hardblock-content are difficult to process and result in products with a very high hardness.

Formulations comprising high amounts of 4,4'-MDI and polyether polyols having high EO-contents have already been used to prepare flexible polyurethane foams, see for example EP-A 547764, EP-A 547765 and EP-A 549120.

The preparation of elastomeric polyurethanes from polyether polyol having low ethylene oxide (EO)-content is also known, see for example U.S. Pat. No. 5,122,548 and EP-A 13487.

It has now surprisingly been found possible to produce microcellular polyurethane elastomeric foams which have a very high hardblock-content, without having an excessively high hardness and which are easily processable over a wide density range.

Thus, according to the invention, there is provided a method for the preparation of microcellular elastomeric polyurethane foams from a reaction mixture comprising a polyisocyanate component, a polyol composition, a chain extender, water and optionally a cross-linking agent, wherein the polyisocyanate component contains at least 85% by weight of 4,4'-diphenylmethane diisocyanate or a variant thereof, the polyol composition comprises at least one polyoxyalkylene polyol containing oxyethylene residues, said polyol composition having an average nominal hydroxyl functionality of from 2 to 6, an average hydroxyl equivalent weight of at least 1300 and an average oxyethylene content of between 50 and 85% by weight, and the chain extender has an average hydroxyl equivalent weight of from 15 to 250, the hardblock-content being more than 45% by weight.

The polyisocyanate component used in the method of the invention may consist essentially of pure 4,4'-diphenylmethane diisocyanate or mixtures of that diisocyanate with one or more other organic polyisocyanates, especially other diphenylmethane diisocyanate isomer, for example the 2,4'-isomer optionally in conjunction with the 2,2'-isomer. The polyisocyanate component may also be an MDI variant derived from a polyisocyanate composition containing at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanate composition and/or by reacting with one or more polyols.

Preferred as the polyisocyanate component are polyisocyanate compositions containing at least 90% by weight of 4,4'-diphenylmethane diisocyanate. Polyisocyanate compositions containing at least 95% by weight of 4,4'-diphenylmethane diisocyanate are most preferred.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation. It is preferred that the average nominal hydroxyl functionality of the polyol composition is from 2 to 4, most preferred polyoxyalkylene polyols being diols or triols.

The composition may comprise a single polyoxyalkylene polyol which preferably is a poly(oxyethylene-oxypropylene) polyol having the required average nominal hydroxyl functionality, hydroxyl equivalent weight and oxyethylene content. Such polyols are known in the art and may be obtained in conventional manner by reacting ethylene and propylene oxides simultaneously and/or sequentially in any order with an initiator having from 2 to 6 active hydrogen atoms such as water, a polyol, a hydroxylamine or a polyamine and the like. Examples of polyol initiators are ethylene glycol, diethylene glycol, propylene glycol, dipropylene glycol, 1,3-propane diol, neopentyl glycol, 1,4-butanediol, 1,5-pentanediol, 1,6-hexanediol, glycerin, trimethylol propane, erythritol, xylitol, glucose, fructose, mannitol or sorbitol.

Alternatively, the polyol composition may comprise a mixture of two or more polyols such that the total composition has the required average nominal hydroxyl functionality, average hydroxyl equivalent weight and oxyethylene content. The other polyols may be selected from polyethers, polyesters, polythioethers, polycarbonates, polyacetals, polyolefins or polysiloxanes.

Polyether polyols may be, for example, polyoxypropylene polyols, polyoxyethylene polyols or poly(oxyethylene-oxypropylene) polyols containing less than 50% or more than 85% by weight of oxyethylene residues.

Polyester polyols which may be used include hydroxyl-terminated reaction products of dihydric alcohols such as ethylene glycol, propylene glycol, diethylene glycol, 1,4-butanediol, neopentyl glycol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polyesteramides may be obtained by the inclusion of aminoalcohols such as ethanolamine in polyesterification mixtures.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols.

Other polyols which may be used comprise dispersions or solutions of addition or condensation polymers in polyols of the types described above. Such modified polyols, often referred to as "polymer" polyols have been fully described in the prior art and include products obtained by the in situ polymerisation of one or more vinyl monomers, for example styrene and acrylonitrile, in polymeric polyols, for example polyether polyols, or by the in situ reaction between a polyisocyanate and an amino- and/or hydroxyfunctional compound, such as triethanolamine, in a polymeric polyol.

Preferably, the polyol composition has an average hydroxyl equivalent weight of at least 1500. The average oxyethylene content of the polyol composition is preferably between 60 and 85% by weight.

Suitable low molecular weight chain extenders include aliphatic diols, such as ethylene glycol, 1,3-propanediol, 2-methyl-1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 2,2-dimethyl-1,3-propanediol, diethylene glycol, dipropylene glycol and tripropylene glycol, and aminoalcohols such as ethanolamine, N-methyldiethanolamine, N-ethyldiethanolamine and the like. Ethylene glycol is preferred.

The amount of water is suitably less than 2% by weight, and preferably less than 1% by weight, based on the total weight of the isocyanate-reactive compounds.

In another aspect, the invention relates to microcellular elastomeric polyurethane foams having a density of less than 1000 kg/m$^3$ and a Shore A hardness of at least 75. Preferably the density is less than 800 kg/m$^3$ and the Shore A hardness at least 80. Most preferably, the microcellular elastomeric polyurethane foams have a density of less than 600 kg/m$^3$ and a Shore A hardness of at least 85.

In a further aspect, the invention provides a reaction system comprising:

(i) a polyisocyanate containing at least 85% by weight of 4,4'-diphenylmethane diisocyanate or a variant thereof;

(ii) a polyol composition comprising at least one polyoxyalkylene polyol containing oxyethylene residues, said polyol composition having an average nominal hydroxyl functionality of from 2 to 6, an average hydroxyl equivalent weight of at least 1300 and an average oxyethylene content of from 50 to 85% by weight, (iii) a chain extender having an average hydroxyl equivalent weight of from 15 to 250;

(iv) water, and optionally, (v) one or more additives conventional to elastomer formulations.

This reaction system is used for making microcellular elastomeric polyurethane foams.

The term "reaction system" is defined as a system wherein the polyisocyanate is kept in a container separate from the isocyanate-reactive ingredients.

The isocyanate index of the reaction system, taking account of the polyol composition, water and any other isocyanate-reactive species, for example chain extenders or crosslinking agents, may be as low as 85 or as high as 120. Preferably, the isocyanate index is between 90 and 110.

The hardblock-content is preferably at least 50% by weight of the total composition.

Low molecular weight isocyanate-reactive compounds having an average functionality of 3 or more, such as glycerol, pentaerythritol or triethanolamine, may be added as crosslinking agents.

The foam-forming reaction mixture may contain one or more of the additives conventional to such reaction mixtures. Such additives include catalysts, for example tertiary amines and tin compounds, surface-active agents and foam stabilisers, for example siloxane-oxyalkylene copolymers, flame retardants, organic and inorganic fillers, pigments, and internal mould release agents.

The process can be carried out according to the 'one-shot', 'semi-prepolymer' or 'prepolymer' method.

A wide range of elastomeric products can be made by the method of this invention.

The elastomers produced by the method of this invention can be used in a large variety of applications such as shoe soles and steering wheels.

The invention is illustrated by the following examples in which all parts, percentages and ratios are by weight.

The following glossary of materials is included to identify reaction components not otherwise identified in the examples.

GLOSSARY

Polyisocyanate I: pure 4,4'-MDI (Suprasec MPR; Commercially available from ICI PLC; Suprasec is a trademark of ICI PLC).

Polyisocyanate II: uretonimine-modified MDI (Suprasec 2020; commercially available from ICI PLC; Suprasec is a trademark of ICI PLC).

Polyol A: Arcol 2580, a polyether triol having random oxyethylene and oxypropylene residues with a 76% oxyethylene content and OH-value of 42 mg KOH/g, commercially available from ARCO; ARCOL is a trademark of ARCO.

Polyol B: EO/PO triol having 10% EO-tip and OH-value of 36 mg KOH/g.

Polyol C: EO/PO diol having 75% random EO-groups and MW=4000.

Catalyst: Dabco EG (33% solution of Dabco in EG obtainable from Air Products; Dabco is a trademark of Air Products).

EG: ethylene glycol.

DEG: diethylene glycol.

EXAMPLES 1–3 AND COMPARATIVE EXAMPLES 1–4

Elastomers were moulded in a 15×10×1 cm mould in a conventional manner from the formulations given in the following Table.

TABLE 1

|  | EX. 1 | EX. 2 | EX. 3 | Comp. EX. 1 | Comp. EX. 2 | Comp. EX. 3 | Comp. EX. 4 |
|---|---|---|---|---|---|---|---|
| POLYOL A | 100 | 100 | — | 100 | — | — | — |
| POLYOL B | — | — | — | — | 100 | 100 | 100 |
| POLYOL C | — | — | 100 | — | — | — | — |
| EG | 16.3 | 14 | 20 | 7.23 | 7.46 | 16.56 | 14.2 |
| DEG | — | 14 | — | — | — | — | 14.2 |
| CATALYST | 0.5 | 0.5 | 0.7 | 1 | 1 | 0.5 | 0.5 |

TABLE 1-continued

|  | EX. 1 | EX. 2 | EX. 3 | Comp. EX. 1 | Comp. EX. 2 | Comp. EX. 3 | Comp. EX. 4 |
|---|---|---|---|---|---|---|---|
| WATER | 0.3 | 1 | 0.7 | 0.3 | 0.3 | 0.3 | 1 |
| POLYISOCYANATE I | Index 100 | Index 100 | — | Index 100 | Index 100 | Index 100 | Index 100 |
| POLYISOCYANATE II | — | — | Index 100 | — | — | — | — |
| HARDBLOCK CONTENT (wt %) | 50 | 50 | 57 | 35 | 35 | 50 | 50 |
| PROPERTIES |  |  |  |  |  |  |  |
| DENSITY (kg/m$^3$) | 702 | 536 | 420 | 650 | 651 | crumbly | crumbly |
| SHORE A HARDNESS | 89 | 90 | 85 | 42 | 72 | material | material |
| ASKER C HARDNESS | 93 | 90 | 89 | 66 | 82 | no | no |
| BALL REBOUND | 36 | 26 | N.M.$^{(*)}$ | 64 | 57 | foam | foam |

N.M.$^{(*)}$: Not measured

These examples show that the use of polyols with a high oxyethylene content in high hardblock formulations results in elastomers having valuable properties which are processable up to high hardness, which is impossible or very difficult with formulations comprising polyols having a low oxyethylene content.

I claim:

1. A method for the preparation of microcellular elastomeric polyurethane foams from a reaction mixture comprising a polyisocyanate component a polyol composition, a chain extender, water and optionally a cross-linking agent wherein the polyisocyanate component contains at least 85% by weight of 4,4'-diphenylmethane diisocyanate or a variant thereof, the polyol composition comprises at least one polyoxyalkylene polyol containing oxyethylene residues, said polyol composition having an average nominal hydroxyl functionality of from 2 to 6, an average hydroxyl equivalent weight of at least 1300 and an average oxyethylene content of between 60 to 85% by weight, and the chain extender has an average hydroxyl equivalent weight of from 15 to 250, the hardblock-content of the reaction mixture is more than 45% by weight.

2. A method according to claim 1 wherein the polyisocyanate component contains at least 90% by weight of 4,4'-diphenylmethane diisocyanate or a variant thereof.

3. A method according to claim 2 wherein the polyisocyanate component contains at least 95% by weight of 4,4'-diphenylmethane diisocyanate or a variant thereof.

4. A method according to claim 1 wherein the polyoxyalkylene polyol containing oxyethylene residues is a poly(oxyethyleneoxypropylene) polyol.

5. A method according to claim 1 wherein the polyol composition has an average nominal hydroxyl functionality of from 2 to 4.

6. A method according to claim 1 wherein the polyol composition has an average hydroxyl equivalent weight of at least 1500.

7. A method according to claim 1 wherein the hardblock-content is at least 50% by weight.

8. A method according to claim 1 which is carried out at an isocyanate index of 90 to 110.

9. A microcellular polyurethane elastomeric foam having a density of less than 1000 kg/m$^3$ and a Shore A hardness of at least 75.

10. A microcellular polyurethane elastomeric foam according to claim 9 having a density of less than 800 kg/m$^3$ and a Shore A hardness of at least 80.

11. A microcellular polyurethane elastomeric foam according to claim 10 having a density of less than 600 kg/m$^3$ and a Shore A hardness of at least 85.

12. A reaction system comprising:
    (i) a polyisocyanate containing at least 85% by weight of 4,4'-diphenylmethane diisocyanate or a variant thereof;
    (ii) a polyol composition comprising at least one polyoxyalkylene polyol containing oxyethylene residues having an average nominal hydroxyl functionality of from 2 to 6, an average hydroxyl equivalent weight of at least 1300 and an average oxyethylene content of from 50 to 85% by weight;
    (iii) a chain extender having an average hydroxyl equivalent weight of from 15 to 250;
    (iv) water, and optionally,
    (v) a cross-linking agent and one or more additives conventional to elastomer formulations.

13. The method of claim 4 wherein the polyolxyalkylene polyol is a diol.

14. The method of claim 4 wherein the polyolxyalkylene polyol is a triol.

15. The method of claim 4 wherein the (oxyethyleneoxypropylene) polyol has less than 50% by weight oxyethylene residues.

16. The method of claim 4 wherein the (oxyethyleneoxypropylene) polyol has less than 85% by weight oxyethylene residues.

17. The method of claim 1 wherein the chain extender is selected from the group consisting of ethylene glycol, 1,3-propanediol, 2-methyl-1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 2,2-dimethyl-1,3-propanediol, diethylene glycol, dipropylene glycol and tripropylene glycol.

18. The method of claim 1 wherein the chain extender is an aminoalcohol selected from the group consisting of ethanolamine, N-methyl-diethanolamine, N-ethyl-diethanolamine.

19. The method of claim 1 wherein the chain extender is ethylene glycol.

20. The system of claim 12 wherein the chain extender is selected from the group consisting of ethylene glycol, 1,3-propanediol, 2-methyl-1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 2,2-dimethyl-1,3-propanediol, diethylene glycol, dipropylene glycol and tripropylene glycol.

21. The system of claim 12 wherein the chain extender is an aminoalcohol selected from the group consisting of ethanolamine, N-methyldiethanolamine, N-ethyl-diethanolamine.

22. The system of claim 12 wherein the chain extender is ethylene glycol.

23. The method of claim 1 wherein water is present in an amount less than 2 percent by weight based on total weight of the isocyanate-reactive component.

24. The method of claim 1 wherein water is present in an amount less than 1 percent by weight based on total weight of the isocyanate-reactive component.

25. The system of claim 12 wherein water is present in an amount less than 2 percent by weight based on total weight of the isocyanate-reactive component.

26. The system of claim 12 wherein water is present in an amount less than 1 percent by weight based on total weight of the isocyanate-reactive component.

27. The system of claim 12 having an isocyanate index of 85–120.

28. The system of claim 12 having an isocyanate index of 120.

29. The system of claim 12 having an isocyanate index of 85.

30. The system of claim 12 having an isocyanate index of 90–110.

31. The system of claim 12 having a hardblock content of at least 50% by weight.

32. The system of claim 12 further comprises isocyanate reactive compounds having an average functionality of 3 or more.

33. The system of claim 32 wherein the isocyanate reactive compounds are selected from the group consisting of glycerol, pentaerytheritol, and triethanolamine.

34. A system according to claim 12 wherein the polyisocyanate component contains at least 90% by weight 4,4'-diphenylmethane diisocyanate or variant thereof.

35. A system according to claim 32 wherein the polyoxyalkylene polyol containing oxyethylene residues is a poly(oxyethyleneoxypropylene) polyol.

36. A system according to claim 32 wherein the polyol composition has an average nominal hydroxyl functionality of from 2 to 4.

37. A system according to claim 32 wherein the polyol composition has an average hydroxyl equivalent weight of at least 1500.

38. A system according to claim 32 wherein the polyol composition has an average oxyethylene content of 60 to 85% by weight.

39. A system according to claim 32 having an isocyanate index of 90 to 110.

* * * * *